UNITED STATES PATENT OFFICE 2,299,411

CATALYZED HYDROBROMINATION OF UNSATURATED ORGANIC COMPOUNDS

Frederick Rust and William E. Vaughan, Berkeley, Calif., assignors to Shell Development Company, San Francisco, Calif., a corporation of Delaware No Drawing. Application August 25, 1941, Serial No. 408,212

9 Claims. (Cl. 260—663)

This invention relates to an improved process for the hydrobromination of unsaturated organic compounds, and more particularly to improvements in the method of controlling the addition of hydrogen bromide to unsymmetrical organic compounds containing at least one olefinic or acetylenic linkage to produce addition products of a predetermined character.

It is known that hydrogen halides may be added to unsaturated hydrocarbons and to various unsaturated derivatives thereof. In fact, in 1870 Markownikoff stated that "if an unsymmetrical hydrocarbon combines with a halogen acid, the halogen adds to the carbon atom with fewer hydrogen atoms, i. e. to the carbon atom which is more under the influence of other carbon atoms." The same investigator further determined that when a hydrogen halide is added to a halogenated unsaturated compound such as vinyl chloride or a chlorinated propylene (i. e. to unsaturated hydrocarbons wherein one of the unsaturated carbon atoms carries a halogen atom, or wherein these unsaturated carbon atoms contain dissimilar numbers of halogen atoms directly attached thereto), the halogen atom of the hydrogen halide will add to the double bonded (unsaturated) carbon atom which carries the greater number of halogen atoms, while the hydrogen atom of the hydrogen halide molecule attaches to the adjacent unsaturated carbon atom. The above type of hydrohalogenation is termed "normal" to distinguish it from the "abnormal" addition of a hydrogen halide, in which the hydrogen and halogen atoms are added in positions which are interchanged with respect to addition according to the above-outlined Markownikoff rule.

Various methods have been proposed for controlling the described hydrohalogenation reaction so as to form reaction products in which the hydrogen halide has been added contrary to the above Markownikoff rule. For instance, it has been proposed to effect the hydrohalogenation reaction in the presence of various peroxides, such as hydrogen peroxide, acetyl peroxide, ascaridole, and the like, as well as of compounds of the type of oxygen, air or ozone, all of which tend to form peroxides when contacted with unsaturated hydrocarbons. Also, it has been found that hydrogen bromide may be added to the unsaturated organic compounds in a manner contrary to Markownikoff's rule by effecting the reaction under the deliberate influence of ultra-violet radiations in the presence or absence of sensitizers of the class of certain ketones, aldehydes and metal alkyls which tend to initiate the reaction chains.

It is known that the presence of peroxides or of peroxide-forming compounds in unsaturated organic compounds, e. g. unsaturated hydrocarbons, is undesirable. For example, organic peroxides, when present even in relatively small concentrations, tend to catalyze the polymerization of a large number of unsaturated hydrocarbons, and particularly diolefins. As to the "abnormal" addition of hydrogen bromide to unsaturates by effecting the reaction under the deliberate influence of light, and particularly of ultra-violet radiations having wave-lengths of below about 2900 to 3000 Angstrom units, such processes necessitate the use of special equipment, such as reaction vessels provided with or containing lamps made of quartz or other suitable materials, e. g. calcium fluoride, capable of transmitting rays of the defined wave-length, or reaction vessels consisting of such materials or containing openings or windows made of such material.

It has now been discovered that unsaturated organic compounds of the class more fully described hereinbelow may be reacted with hydrogen bromide to effect directional addition thereof via the so-called "abnormal" addition, i. e. contrary to the course stated or suggested by Markownikoff, this reaction being effected in the absence of the undesirable peroxides or peroxide-forming compounds, and without the necessity of employing any special equipment or apparatus which was heretofore necessary when the reactions were effected under conditions requiring irradiation of the reactants. According to the present process, such "abnormal" addition of the hydrogen bromide to the unsaturated organic compounds is attained by effecting the reaction in the presence of ketones containing a bromine atom on the carbon atom in alpha position with respect to the carbonyl group. These bromoketones apparently act as sensitizers to initiate the reaction mechanism, and also as compounds which affect the direction of addition of the bromine atoms to the unsaturates treated. For example, as shown in the examples, when hydrogen bromide is mixed with propylene, and when the addition reaction is not controlled by any means, such as the addition of peroxides or the use of ultra-violet radiations, the reaction product predominates in, or even consists solely of isopropyl bromide. On the other hand, the addition of even small quantities of a bromoketone, e. g. bromo-acetone, effects a directional control of the addition reaction, the product consisting of substantially pure n-propyl bromide. The bromoketones promote the "abnormal" addition of the hydrogen bromide even when the reaction thereof with the unsaturated organic compounds is effected in the dark and at normal temperatures, i. e. in the neighborhood of about 25° C. to about 15° C., or even at considerably lower temperatures. The advantages of the present process over the previously known processes of "abnormal" addition of hydrogen bromide will be readily apparent to those skilled in the art, it being noted that the process does not require any special equipment, or the use of elevated temperatures, and does not result in the presence of undesirable peroxides in the reactants and/or reaction products.

The compounds which, according to the process of the invention, promote the abnormal hydrobromination of the unsaturates even when the reaction is effected in the dark and at normal temperatures of about 20° C. or even at lower temperatures, are bromoketones containing a bromine atom directly linked to the carbon atom in alpha position with respect to the carbonyl group. The bromoketones may contain alkyl, aryl or aralkyl radicals attached to the carbonyl group. The following is a list of representative hydrobromination-promoting bromoketones: bromo-acetone, alpha-bromo-acetophenone, alpha-bromo-cyclohexanone, alpha-alpha'-dibromo-acetone, alpha-alpha-dibromo-acetone, 3-bromo-butanone-2, 1-bromo-butanone-2, 1-phenyl-1-bromo-acetone, alpha-bromo-acetoacetic acid and the like, and their homologues.

Although there is no intention of being limited by any theory of the case, it is believed at the present time that the abnormal hydrobromination reaction occurs with the following or some similar reaction chain mechanism which is initiated by the reaction of the bromo-ketones with the hydrogen bromide:

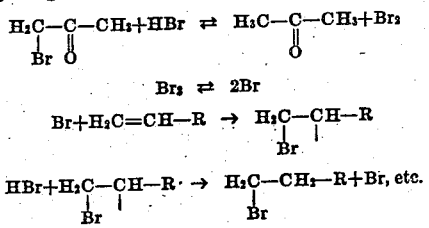

wherein R denotes any organic radical. The quantity of the bromoketone or mixture of bromoketones to be added to the reactants may vary within relatively wide limits, it being understood that the amount should be sufficient to initiate and maintain the reaction chain mechanism.

The unsaturated organic compounds which may be treated according to the process of this invention include hydrocarbons containing one or more olefinic and/or acetylenic linkages. Examples of such hydrocarbons are ethylene, propylene, butene-1, butene-2, isobutylene, pentene-1, pentene-2, hexene-1, 4-methyl-pentene-1, 4,4-dimethyl-pentene-1, 4-methyl-pentene-2, octene-1, decene-1, cetene-1, styrene, cyclohexene, 3 - methyl - cyclohexene, 1,4-diphenyl - butene-2, butadiene - 1,3, pentadiene - 1,3, pentadiene - 1,4, hexadiene-1,5, hexadiene-1,4, acetylene, propyne, butyne-1, pentyne-2, hexyne-1, cetyne-1, octylacetylene, phenyl-acetylene, and the like. The above compounds, and their various homologues, may be substituted in the nucleus and/or in the substituents in various degrees. For instance, the unsaturates may contain one or more halogen atoms attached to saturated and/or unsaturated carbon atoms. Representative examples of these compounds are: vinyl halides, allyl halides, crotyl halides, methallyl halides, and the like. Other examples of substituted unsaturated hydrocarbons are methyl acrylate, methyl methacrylate, divinyl ether, diallyl ether, dimethallyl ether, and the like.

A particularly suitable group of organic compounds which may be reacted with hydrogen bromide via abnormal addition comprises the compounds, and particularly the hydrocarbons, in which the unsaturated linkage is in the terminal or alpha position. Also, aliphatic hydrocarbons and their various substituted derivatives, e. g. halo-substituted derivatives, containing unsaturated linkages both in alpha and omega positions (i. e. terminal positions) may be readily hydrobrominated via abnormal addition to produce compounds in which both terminal carbon atoms have bromine atoms attached thereto. Another group of organic compounds which may be employed as the primary material comprises or includes organic compounds wherein an olefinic linkage is in non-terminal position between two carbon atoms having a dissimilar number of hydrogen atoms attached to each of said unsaturated carbon atoms due, for example, to various substituents attached thereto. For instance, the double bond may be between two carbon atoms which are of secondary and tertiary character, respectively. Another example is a compound in which the unsaturated carbon atoms are both primary or both secondary, but have unequal numbers of halogen atoms, such as chlorine, bromine, fluorine and/or iodine atoms, attached to them.

The abnormal addition of the hydrogen bromide to the above-defined class of unsaturated organic compounds in the presence of the specified group of bromoketones may be effected in the vapor or liquid phase, or in a two-phase liquid-vapor system. Generally, no heating of the reactants is necessary. In fact, in many instances the reaction, although it may be realized in the vapor phase and at temperatures of above 25° C., is preferably effected in the liquid phase and at temperatures which are even below 0° C. The reaction temperature, however, should not be below that at which the unsaturated hydrocarbon treated or the specific bromo-ketone employed becomes congealed. It was also found that the abnormal addition according to the present process, when the reaction is effected in the presence of the bromoketones, proceeds regardless of the presence or absence of a liquid phase or film in the reaction zone.

The reaction may be effected in a batch, intermittent or continuous manner. When the process is executed batch-wise, the reactants, together with a suitable amount of the bromoketone, may be conveyed under any desirable or optimum pressure and temperature into a suitable container, and then allowed to stand for a period of time sufficient to permit the desirable or optimum degree of conversion. Although the reactants may be kept in the dark, it is frequently possible to subject the reactants to the simultaneous action of light and of the bromoketones, such a procedure increasing the rate of conversion to the desired products.

The following examples, which are to be construed as illustrative only, represent a specific embodiment of the invention. It is to be understood, however, that there is no intention of being limited by any details set forth.

Example I

Propylene and hydrogen bromide were introduced together with bromoacetone into a pyrex glass reactor in a liquid state and at a temperature of about —78° C., the volumetric ratio of the three compounds in the reactor being 17:9.5:1. The reaction vessel was then sealed and allowed to stand for a period of about ten minutes while completely shielded even from diffused light. During this period of time the temperature within the reactor gradually rose to about 20° C. The reactor was then cooled by the use of solid carbon dioxide, the product removed from the vessel, washed with caustic soda solution and water, dried, and distilled. An analysis of the product obtained showed a substantially quantitative conversion to n-propyl bromide (i. e. product of abnormal addition). This reaction product had an index of refraction $n^{20}_D$ equal to 1.4340, while that of pure n-propyl bromide is 1.4341.

Example II

Approximately 4.4 cc. of butene-1, about 3.2 cc. of hydrogen bromide and 0.1 cc. of bromoacetone were mixed together and kept in the dark for a period of five minutes. The reaction product was then worked up as in the previous example. The yield was again substantially quantitative, the reaction product being substantially pure n-butyl bromide having an index of refraction $n^{20}_D$—1.44—(the theoretical being $n^{20}_D$—1.4398).

Example III

Propylene and hydrogen bromide were reacted under substantially the same conditions as those employed in Example I, with the exception that the reaction time was lengthened to two hours and that acetone was employed in lieu of the bromo-acetone. As in the previous experiments, the reaction was effected in the substantial absence of light. The reaction product consisted solely of isopropyl bromide, i. e. product of the normal addition of the hydrogen bromide. This showed that ketones, when used alone, do not promote the abnormal addition which is realized by the use of the bromoketones.

We claim as our invention:

1. In a process for effecting abnormal addition of hydrogen bromide to propylene, the steps of adding bromo-acetone to the reaction mass, and effecting the reaction in the dark and at a temperature not in excess of about 25° C.

2. In a process for effecting abnormal addition of hydrogen bromide to propylene, the step of adding to the reaction mass a bromoketone having a bromine atom on the carbon atom in alpha position with respect to the carbonyl group.

3. In a process for effecting abnormal addition of hydrogen bromide to butene-1, the steps of adding bromo-acetone to the reaction mass, and effecting the reaction in the dark and at a temperature not in excess of about 25° C.

4. In a process for effecting abnormal addition of hydrogen bromide to butene-1, the step of adding to the reaction mass a bromoketone having a bromine atom on the carbon atom in alpha position with respect to the carbonyl group.

5. In a process of effecting an abnormal hydrobromination by the addition of hydrogen bromide to an aliphatic hydrocarbon containing an alpha olefinic linkage, the steps of adding to the reaction mass a bromoketone having a bromine atom on the carbon atom in alpha position with respect to the carbonyl group, and effecting the reaction in the dark and at a temperature not in excess of about 25° C.

6. In a process of effecting an abnormal hydrobromination, the step of reacting hydrogen bromide with an aliphatic hydrocarbon containing an alpha olefinic linkage in the presence of a bromoketone having a bromine atom on the carbon atom in alpha position with respect to the carbonyl group.

7. In a process of effecting abnormal hydrobromination, the step of reacting a hydrogen bromide with an organic compound unsaturated in alpha position in the presence of a bromoketone having a bromine atom on a carbon atom in alpha position with respect to the carbonyl group.

8. The process according to claim 7, wherein the reaction is effected in the dark and at a temperature not in excess of about 25° C.

9. In a process of effecting abnormal addition of hydrogen bromide, the step of reacting hydrogen bromide with a compound selected from the group consisting of unsaturated hydrocarbons containing at least one olefinic linkage in asymmetrical position in the molecule, their halo-substitution derivatives, and symmetrical unsaturated aliphatic and alicyclic hydrocarbons containing a halogen atom attached directly to only one of the unsaturated carbon atoms in the presence of a bromoketone having a bromine atom on a carbon atom in alpha position with respect to the carbonyl group.

FREDERICK RUST.
WILLIAM E. VAUGHAN.